UNITED STATES PATENT OFFICE.

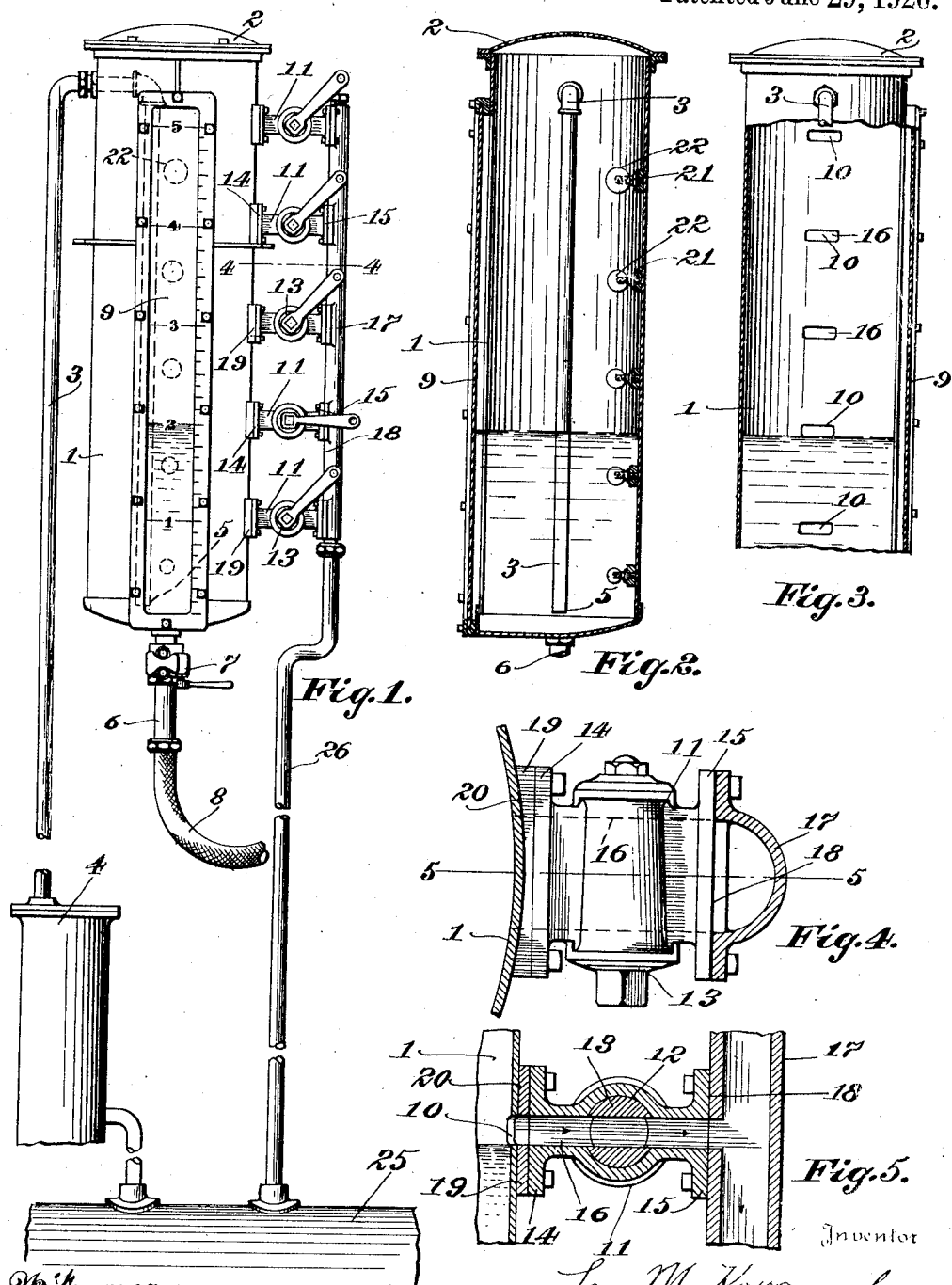

LEO M. KAVANAGH, OF BALTIMORE, MARYLAND.

GASOLENE-DISPENSING APPARATUS.

1,344,949.  Specification of Letters Patent.  Patented June 29, 1920.

Application filed April 5, 1917. Serial No. 159,875.

*To all whom it may concern:*

Be it known that I, LEO M. KAVANAGH, a citizen of the United States of America, residing in the city of Baltimore, State of Maryland, have invented certain new and useful Improvements in Gasolene-Dispensing Apparatus, of which the following is a specification.

The general and extensive consumption of gasolene with the consequent necessity for special measuring and dispensing apparatus requiring rigid supervision by the local authorities over the sale and particularly over the measuring of this commodity has resulted in the condemnation of a large amount of dispensing apparatus on account of its failure to meet the requirements for accuracy. The greater portion of the dispensing apparatus used in this connection includes as a main feature a measuring pump of the cylinder and piston type which is dependent for its measuring function on an indicator or counter which registers the number of strokes made by the pump. These measuring pumps are defective and inconsistent in their operation, that is, the quantity pumped at each stroke is dependent upon the fit of the piston in the cylinder and also upon the tightness of the valves. As both are variable because of friction and consequent wear at these points, the degree of accuracy of the measurement varies from time to time and such variation results in the condemnation of the apparatus by the authorities and often in penalty to the owner.

The object of applicant's invention is to produce a measuring device adapted to be connected to such a dispensing pump to measure the gasolene after it is pumped so the previous apparatus can be utilized except as to its measuring feature, operating at all times with a uniform degree of accuracy well within the limits set by the authorities. In an original installation any suitable pump may be used with considerable saving of expense compared to the regular dispensing pumps.

The apparatus consists of a tank with means for indicating or observing the height of the liquid in the tank and suitable overflow passages arranged at one or more levels to determine the height to which the tank can be filled. These overflow openings are opened and closed at will and the level of the lowermost opening not thus closed determines the height of the liquid in the tank and at the same time indicates or measures the quantity in the tank, the tanks being ordinarily designed and the openings so placed as to give an even number of gallons at the lower level of each opening, the number of gallons increasing by one from each opening to the next. The tanks are ordinarily of such size as to hold five or ten gallons. Means is provided for filling the tank and there is an outlet usually at the bottom from which the gasolene after being measured is led to the purchaser's reservoir or tank in which it is finally carried away.

Such measuring tanks have not come into general use. One reason for this is the slowness of operation. The simplest form of tank has an overflow manifold and the passages leading from the tank at the measuring level are ordinarily made round as are the pipes. When the tank is filled with liquid above the overflow level, the escape of the overflow is fairly rapid for a time and then gradually reduces until it finally ceases. The reduced stream makes the approach to the measuring level very slow so that the whole apparatus, unless it is wastefully operated, is too slow for use at a busy dispensing station.

The applicant has overcome this difficulty by using a wide, flat or rectangular passage, preferably considerably elongated as compared to its height so that the flow is maintained at considerable volume up to the time that the level of the gasolene reaches the bottom of the passage. There are usually several of these passages, the difference between the capacity of the tank at the level of each passage being usually one gallon. Each passage is provided preferably with a horizontal plug valve having an elongated slot of cross-section to conform to the passage. Also, in order that the construction may be produced at a moderate cost, each of the horizontal passages or branches of the manifold with the valve seat for each branch is made in a single casting having a flange at each end at right angles to the length of the pipe and the manifold proper or main duct, into which all the passages lead, is preferably made with a flat side adjacent the tank so that the flat flanges are easily seated on the flat surface of the manifold; and blocks convexedly curved on one side and flat on the other, the curved sides fitting the surface of the tank, are provided as a seating means for the flat flanges on the overflow pipes at the end adjacent the tank.

The tank is also provided with a sight-glass graduated as to the number of gallons, and the bottom of the tank is dished or curved having the outlet or delivery pipe from which the gasolene is fed to the purchaser's tank at the bottom of the curve or dish so that the last drop will drain quickly and easily. In the present instance the bottom of the tank is further so shaped that the sight-glass, though in the form of a flat window in the side of the tank, extends to or almost to the lowest level of the gasolene so that a single gill in the tank may, if desired, be observed and measured.

As a further improvement, because of the fact that it is difficult to make a tank exactly according to standard, means is provided for adjusting the volume of the tank between each of the overflow points. In the present instance, this is in the form of a screw stud or other fastening means between each such level and a series of balls or blocks of various sizes threaded to fit the screws is used, the tank being made in all instances a little larger than the desired capacity and thus adjusted to standard by affixing to the fastening a block or ball of the requisite size. If at any time the measurement is found to be incorrect, the size of any particular block or ball can of course be conveniently changed, a set of these if desired being furnished with each tank.

In the accompanying drawings, I have illustrated a gasolene dispensing apparatus embodying the features of my invention in their preferred form.

In the drawing, Figure 1 is an elevation;

Fig. 2 is a vertical central section taken at right angles to the plane of Fig. 1, looking to the left;

Fig. 3 is a vertical central section taken at right angles to Fig. 1 looking to the right;

Fig. 4 is a section on the line 4, 4 of Fig. 1, i. e., a horizontal section through one of the overflow passages (this section may be considered to have been taken through any one of said passages); and Fig. 5 is a section on the line 5, 5 of Fig. 4.

Referring to the drawings by numerals, each of which is used to indicate the same or similar parts in the different figures, there is a tank 1, preferably cylindrical in form, closed at the top by a suitable cap 2 provided with a suitable supply pipe 3 leading from a pump 4 and extending downward inside the tank and delivering the gasolene at a point 5 where it terminates near the bottom of the tank, and a delivery pipe 6 having a suitable valve 7 and terminating in a flexible delivery hose 8 to be inserted in the purchaser's tank.

The measuring tank or chamber 1 is provided with suitable means for indicating the level of the liquid therein. In the present instance, there is a glass or other transparent window 9 in the side of the tank, extending almost the entire length and graduated in suitable units. In accordance with the invention there is an overflow outlet 10 and branch duct 11 having its lower level or surface in the horizontal plane of each graduation, marking the multiples of a certain unit. As illustrated, there is one opposite each gallon mark, 1, 2, 3, 4, 5. By reference to Fig. 3, it will be noted that the openings 10 are rectangular and elongated in a horiontal direction and flat or straight as to the bottom edge and the ducts 11 have an opening or passage of similar cross-section. The bottom of the tank is a scoop like structure, such as would be formed by depressing one portion or edge of a dish or saucer like member.

The branch ducts 11 consist each of a separate casting having a seat 12 for a plug valve 13 and having at each end a flat flange 14, 15 at right angles to the passage-way 16 which, as I have pointed out, is preferably rectangular. This makes a cheap and conveniently manufactured structure. The ducts or branch pipes terminate in a vertical manifold proper or main duct 17 which is flat on the inner surface 18 to form a suitable seating surface for the flanges 15 and the openings 10 in the tank are inclosed and the surface of the tank built up by flat gaskets or metal collars 19 each having a suitable opening corresponding to the hole 10, being flat on one surface as a seat for the flat flange 14 and having a concave curved surface 20 on the other side to fit the surface of the cylindrical tank. The gaskets or collars 19, the duct sections 11, the plug valves 12 and the manifold 17 are all so designed that each may be made of a cheap and simple casting making the manufacture of the apparatus comparatively easy. The parts are arranged to be assembled by bringing the flat surfaces into contact fastening the parts by bolts or rivets. On the inside of the tank I have shown a series of threaded studs 21 and with each tank I supply a series of balls or blocks 22 of graduated sizes. These are each bored and tapped to fit the studs, or other fastening means may be provided within the scope of the invention. The studs are located one between each pair of overflow openings 10 so that the tank being made a little larger than the intended capacity, the content may be adjusted at any time it is found incorrect to meet the demands of the authorities.

The manner of operation is apparent. The valve 7 in the delivery outlet 6 is closed as are likewise all the valves 13 below the graduation corresponding to the number of gallons to be measured. The tank is then filled by a suitable pump 4 from the supply 25, the gasolene passing through the pipe 3 to the point of delivery to the tank at 5. By releasing the liquid at a point near the bottom, splashing with excessive vaporization is prevented.

If four gallons is the amount required, the valve 13 opposite the graduation 4 is left open. When the gasolene reaches this level it commences to overflow. The pumping is then stopped and the excess gasolene escapes through the overflow opening 10, flowing through the passage 16 of the branch duct 11 to the main duct or manifold 17 and via the return pipe 26 back to the supply. The openings 10 and passages 16 of cross-section elongated horizontally, cause the flow to maintain its volume as the measuring level is approached, giving much quicker action than with the usual round pipe, and the design of the parts with the flat manifold, etc., as illustrated, makes the device easy to assemble and cheap to construct.

Other features and advantages of the invention have been enumerated.

I have thus described my invention specifically and in detail in order that its nature and operation may be fully understood; however, the specific terms herein are used descriptively rather than in their limiting sense and the scope of the invention is defined in the claims:

1. In a dispensing tank, a series of overflow outlets at different levels corresponding to known volumes, means for correcting the volume at the various levels consisting of a series of detachable members, and means for fastening them in suitable positions corresponding to such volumes to vary and adjust the capacity of the tank.

2. In a dispensing tank, a series of overflow outlets at different levels corresponding to known volumes, means for correcting the volume at the various levels consisting of a series of detachable members, and means for fastening them in suitable positions corresponding to such volumes to vary and adjust the capacity of the tank at the different levels.

3. In a gasolene dispensing apparatus, a measuring tank with a dished or cupped bottom, a delivery outlet at the lowermost point of the bottom, and a window to observe the level of the fluid in the tank, the bottom having a depressed portion extending from the outlet to the window so that the lowest level of gasolene is observable through the window and at the same time the tank is capable of being fully drained at each operation.

Signed by me at Baltimore, Maryland, this 3rd day of April 1917.

LEO M. KAVANAGH.

Witnesses:
CHAS. J. SILVERSON,
ZELLA KUHN.